July 2, 1940.　　E. G. J. PEDERQUIST　　2,206,672

CONNECTOR

Filed March 1, 1938

INVENTOR
ERNEST G. J. PEDERQUIST
BY
ATTORNEYS

Patented July 2, 1940

2,206,672

UNITED STATES PATENT OFFICE 2,206,672

CONNECTOR

Ernest G. J. Pederquist, Bloomfield, N. J., assignor to The Rajah Company, Bloomfield, N. J., a corporation of New Jersey Application March 1, 1938, Serial No. 193,236

3 Claims. (Cl. 173—322)

This invention relates to a connector for connecting flexible strands, such as insulated cable, hose, rod or tubing of flexible elastic material, e. g., rubber or fabric and the like.

Prior to my invention the connection of such flexible strands to rigid members or apparatus or even the coupling of several lengths of such strands together had always been a difficult problem. Numerous devices for connecting rigid rods, pipes, etc., have been known, but in general these have not been applicable where such members are made of a flexible material which can yield and alter its shape, and particularly where such materials are relatively soft as in the case of rubber, fabric and similar materials. One method which has been used with substantially rigid tubes is the compression of a rubber or fibrous packing or a thin sheet metal ferrule in a packing gland. This method, however, has depended on a frictional engagement between the soft or thin metal material of the packing and the relatively hard material of the rod or pipe or tube around which the packing is compressed. It has been suggested moreover, to use such packing glands for securing insulated wires, but they have never been accepted in practical use in connection with flexible strands, such as rubber, fibrous fabric and the like; and I believe that this is due to the fact that it has always been sought to secure engagement with the flexible strand by surface friction or adhesion, which necessarily precludes a satisfactory compression of the gland material along the strand. In fact, the ordinary packing glands as heretofore used are not satisfactorily adapted for use on flexible strand materials.

I have now discovered, however, that if such soft friction material is replaced by a wire of material hard enough to depress itself into the soft strand, the packing gland structure may be made satisfactory. Thus, a helical coil of wire or similar material may be compressed axially, for example, in an ordinary packing gland having a compression space a little wider than the wire of the coil, and the slippage of the several coils of the helix one upon the other will result in a radial compression of the strand and a circumferential engagement between the helical coil and the flexible strand which is both tight and secure.

Accordingly, it is an object of my invention to provide a device for connecting flexible strands of various types and sizes to other elements or apparatus.

Another object of my invention is to provide readily removable connections for such flexible strands.

Another object of my invention is to provide such a device which is economical to manufacture and easy to use.

In the accompanying drawing I have illustrated a preferred embodiment of my invention as specifically applied to an electrical flexible insulated cable connector. However, this drawing and the accompanying description are not intended to be exhaustive nor limiting of the invention; but, on the contrary, these are given as illustrations with the purpose of so fully explaining the invention and principles thereof and the best manner of employing it in practical use that others skilled in the art may readily adapt and modify the invention and utilize it in numerous forms and numerous modifications, each as may be best adapted to the conditions of any particular use.

Figure 1:
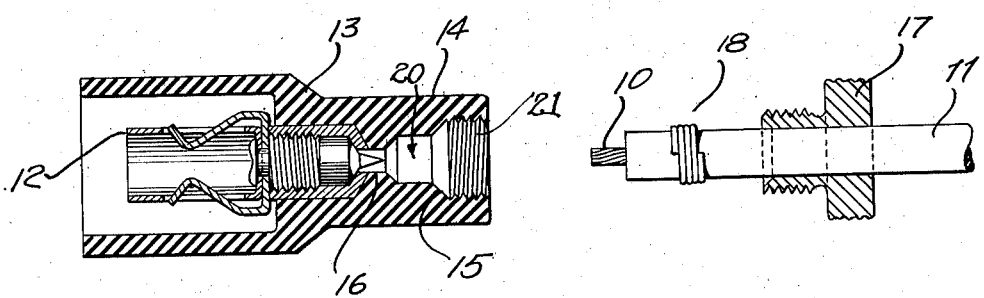
Fig. 1 is a view partly in longitudinal section and partly in elevation showing the parts utilized according in my invention separate but ready for assembly.
Figure 2:
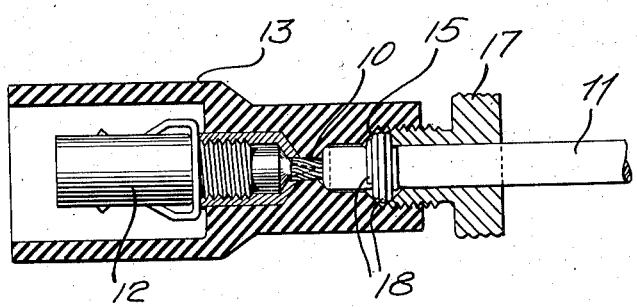
Fig. 2 is a similar view showing the parts assembled and the connection between the flexible strands and the connector fully established.

In the drawing I have shown a flexible electrical cable comprising a stranded central conductor 10 and a heavy rubber insulating sheath 11. The rubber insulation is stripped back for a short distance near one end so that the exposed portion of the central conductor 10 can be connected to a terminal connector 12. An insulating handle 13 is secured over the terminal connector and is provided with a tubular extension 14 extending beyond the connector and over the end of the insulating sheath 11. Near the bottom of the largest bore 21 in this tubular extension 14 is a shelf 15 which is made conical in order to crowd the helical packing coil closer against the insulating sheath 11. In the case illustrated, there is an additional bore 20 in the tubular portion 14 beyond the shelf 15 and which is approximately fitted to the insulating sheath 11. This permits the helical coil to engage the flexible sheath at a distance from its end and thereby to make a more secure engagement than if the coil were allowed to come substantially to the end of the sheath 11.

A still smaller hole 16 is provided, as shown, to allow the stranded conductor 10 to pass through into contact with the terminal connector 12.

The tubular extension 14 is internally threaded, as shown, and a gland nut 17 is provided to screw into this threaded opening. The inner face of the gland nut, as clearly shown in the drawing, is advantageously conical for the same reason that the conical face is used on the shelf 15, namely to crowd the end of the helical coil into closer contact with the flexible strand.

Figure 3:
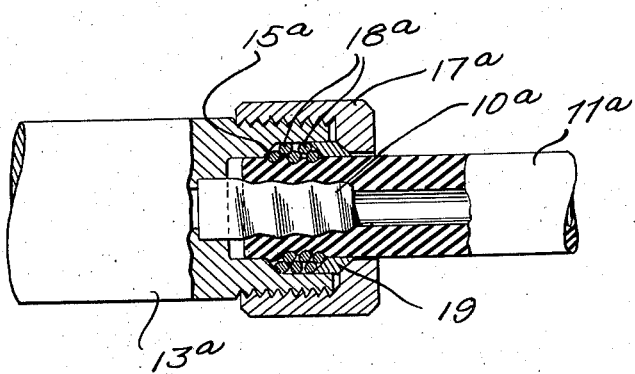
Fig. 3 is a view partly in elevation and partly in cross section of another application of my connector showing a rigid pipe connected to a flexible hose or tubing.

The helical coil 18 completes the combination; and, as appears from the drawing, especially in Figs. 1 and 3, the wire of this helical coil is of a diameter approximately equal to but less than the difference between the radius of the intermediate bore 20 of the tubular extension 14 and the bore of the nut 17 on the one hand and the radius of the larger bore 21 on the other hand. Advantageously the wire is, as shown in the drawing, of diameter slightly less than, but more than half, this difference in radii.

The parts as shown in Fig. 1 are assembled by first inserting the cable with its helical coil 18 and its projecting portion of the conductor 10 bared, as shown, into the insulating handle 13. The helical coil 18 fits into the threaded portion of the tubular extension 14 and engages at the bottom against the shelf 15. The portion of the sheath 11 beyond the helical coil extends on into the smaller opening in the handle 13 and the bared central conductor 10 extends through the smallest opening into the larger space beyond.

The terminal connector 12 is then screwed into the opening on the opposite side of the handle 13 so that its conical point makes an electrical contact with the stranded central conductor 10 and clamps the strands thereof against the sides of the opening.

The gland nut 17 is then screwed down onto the helical coil compressing it axially and causing the turns to crowd down one over the other so as to drive a part of them into the flexible sheath 11 and thus to securely grip the sheath but without danger of cutting or tearing it.

It will be observed that the direction of winding of the helical coil is opposite to that of the screw thread of the gland nut, the former being, in the case illustrated, a left-hand spiral and the latter a right-hand spiral. With this arrangement the screwing down of the gland nut so far as it engages the end of the helical coil tends to tighten the coil upon the sheath 11 and thus further to secure the desired result. If it is desired to separate the connection the procedure is simply reversed. Or, if the helical coil is too firmly engaged in the tubular extension 14, the end of the helical coil may be pulled out and the wire unwound from the coil in order to release the insulation sheath 11 from the insulating handle 13.

Although I have shown in the drawing described above a preferred embodiment as applied to an electrical connector it must not be thought that the invention is in any way limited to this use or to the particular structures shown. As already suggested above, the invention can be applied in the same manner to the coupling or connection of hoses, e. g., for carrying liquids, as for example, gasoline lines or hydraulic brake lines or compressed air lines, e. g., for pneumatic tools, etc.

Thus, I have shown in Fig. 3 a coupling for connecting a flexible rubber hose to a rigid metal pipe or other rigid apparatus. The rubber hose in this case is shown at 11a. The rigid pipe or other element to which it is to be connected is shown at 13a and, as shown, this is provided with a recess near one end which at its bottom approximately fits the end of the hose 11a and near its bottom has a conical shelf 15a against which the helical coil 18a is clamped by means of the gland nut 17a. If the hose 11a is fairly stiff the structure thus far described would be adequate and it will be found that the compression of the helical coil 18a will, partly by driving the hose 11a axially into the end of the recess and partly by squeezing the flexible material of the hose toward its end so as to expand it into said recess, make a fluid-tight connection therein. However, it is desirable, and particularly in the case where the hose 11a is of thin or very flexible material, to provide a nipple 10a welded or threaded into the member 13a so as to make an airtight connection therewith. When the hose is inserted into the recess it is pushed over the nipple and the nipple then makes a substantially rigid core against which the compression from the helical coil 18a can be directed and thus an airtight and secure connection is made between the nipple and the hose. In this case, I have shown a compression washer 19 above the coil 18a to preclude any possibility of the wire 18a becoming caught between the nut 17a and the end of the connection 13a. This washer, however, is not essential and may be omitted with use of a longer coil or a shorter bore.

Likewise, as will be evident to those skilled in the art, the other elements of the combination are merely exemplary. For example, the screw threaded gland member is merely exemplary of numerous well known means for compressing.

The material used for the wire and its cross sectional shape are important in the operation of my invention. The shape should be such that upon longitudinal compression the turns of the coil will tend to slip under and over one another, thus converting the longitudinal compression into a lateral force against the strand. I have found that the best cross sectional shape for my purpose is the circular shape of the ordinary drawn wire. Likewise the material is advantageously sufficiently hard so that this slippage of one turn over another can occur readily, and yet sufficiently soft so that the turns can adjust themselves readily to the changed form required by this compression and slippage. If the material is too soft, as for example with an ordinary soft rubber fibre or cord, there would be excessive friction in the slippage of one turn over another, so that it would be practically impossible to obtain the necessary compression of the packing, and it could not give the desired depression into the insulation or hose or other strand. Likewise, if the material is too hard, as for example with a spring steel wire, the resistance to deformation may be so excessive as to require an excessive axial compression force in order to obtain the necessary lateral engagement with the hose or insulation, etc. I have found that the material most practicable for this purpose is a soft copper wire, which is sufficiently hard for all practical purposes and yet is sufficiently soft to be readily wrapped around the wire and shifted and tightened under the compressive force exerted by the gland nut. Similarly a soft aluminum wire may be used.

My invention will be found most advantageous where the flexible strand is used for pulling on the apparatus to which it is connected. Thus, for example, certain pneumatic or hydraulic apparatus may be carried or pulled by the hose attached to it, and likewise, with insulated electrical cables frequently these are disconnected from the terminals on which they are used by jerking on the wire itself rather than by pulling the terminal connector or its rigid insulating handle. In such case the stress of the pull is taken by the connection embodying my present invention, and there is little danger of breakage or disconnection. It is also an advantage of the form shown, in which the gland nut projects beyond the part to which it is attached, that it provides a convenient projection by which a pull may be more easily exerted upon the rigid portion or handle and thereby encourages the user to pull on that part rather than on the flexible strand which is connected to it.

What I claim is:

1. A connector for a flexible elastic strand which comprises a female member having a bore adapted to receive a portion of said strand, a shelf around said bore, and a larger bore open to the end of said member, a coil of wire adapted to be inserted into said larger bore against said shelf and therein to embrace the end of the strand, the wire of said coil having a diameter substantially less than, but more than half, the difference between the radii of said first-named bore and said larger bore, respectively, and means for compressing said coil axially, said means having a bore of approximately the same radius as said first-named bore of the female member and adapted to receive a portion of said strand and having a shelf around said bore for engaging the end of said coil, at least one of said shelves being sloping with respect to the axis of the bore, whereby to displace laterally the wire in the end of the coil, and the metal of the wire being of hardness sufficient to prevent substantial deformation of its cross-sectional shape during axial compression of the coil whereby successive turns crowd laterally over one another under axial compression.

2. A connector as defined in claim 1, in which the wire of said coil is a wire of approximately the flexibility and hardness of copper.

3. The combination of a flexible elastic strand, a pair of compression members having a bore in each to receive a portion of said strand, having means thereon to exert axial compression between them and having a recess in at least one of said members with a shelf on each of said members at the end of said recess, and a coil of wire wrapped around said strand within said recess said wire being of diameter less than, but more than half, the difference between the radii of the strand before compression and said recess respectively, and said coil being compressed between said shelves and having its various turns radially displaced relative to one another and at least some of said turns crowded into the elastic strand by the axial pressure of said shelves on said coil.

ERNEST G. J. PEDERQUIST.